(12) United States Patent
Yildirim et al.

(10) Patent No.: US 8,016,936 B2
(45) Date of Patent: Sep. 13, 2011

(54) METHODS OF CALCINING PARTICULATE MATERIAL

(75) Inventors: Ismail Yildirim, Milledgeville, GA (US); Robert J. Pruett, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 759 days.

(21) Appl. No.: 11/579,406

(22) PCT Filed: May 2, 2005

(86) PCT No.: PCT/US2005/015112
§ 371 (c)(1), (2), (4) Date: Nov. 2, 2006

(87) PCT Pub. No.: WO2005/108326
PCT Pub. Date: Nov. 17, 2005

(65) Prior Publication Data
US 2008/0105166 A1 May 8, 2008

Related U.S. Application Data

(60) Provisional application No. 60/566,939, filed on May 3, 2004, provisional application No. 60/635,944, filed on Dec. 15, 2004.

(51) Int. Cl.
*C08K 3/00* (2006.01)
(52) U.S. Cl. .................. 106/486; 106/450; 501/141
(58) Field of Classification Search .................. 501/141; 106/450, 486
See application file for complete search history.

(56) References Cited

U.S. PATENT DOCUMENTS

| | | | | |
|---|---|---|---|---|
| 2,278,957 A | * | 4/1942 | Ungerleider et al. | 501/81 |
| 3,013,981 A | * | 12/1961 | Riede | 502/411 |
| 3,450,257 A | | 6/1969 | Cundy et al. | |
| 3,798,044 A | | 3/1974 | Whitley et al. | |
| 3,941,872 A | | 3/1976 | Puskar | |
| 4,227,920 A | | 10/1980 | Chapman et al. | |
| 4,395,289 A | | 7/1983 | Balakirev et al. | |
| 4,578,118 A | * | 3/1986 | Huege et al. | 106/486 |
| 4,634,461 A | | 1/1987 | Demarest, Jr. et al. | |
| 4,678,517 A | * | 7/1987 | Dunaway | 106/486 |
| 4,913,742 A | | 4/1990 | Kwech | |
| 5,137,574 A | | 8/1992 | Suitch et al. | |
| 5,152,835 A | | 10/1992 | Nemeh | |
| 5,371,051 A | | 12/1994 | Pope et al. | |
| 5,543,372 A | * | 8/1996 | Shi et al. | 501/145 |
| 5,674,315 A | | 10/1997 | Bareuther et al. | |
| 5,685,900 A | | 11/1997 | Yuan et al. | |
| 6,068,826 A | | 5/2000 | Maury et al. | |
| 6,334,894 B1 | * | 1/2002 | Kostuch | 106/486 |
| 6,548,438 B2 | | 4/2003 | Brosnan et al. | |
| 2006/0169174 A1 | * | 8/2006 | Sare et al. | 106/312 |
| 2006/0292305 A1 | * | 12/2006 | Skuse et al. | 427/361 |

FOREIGN PATENT DOCUMENTS

| | | |
|---|---|---|
| GB | 445776 | 4/1936 |
| WO | WO 99/24360 | 5/1999 |
| WO | WO 00/32700 A | 6/2000 |
| WO | WO2004050773 * | 6/2004 |
| WO | WO2004059079 * | 7/2004 |

OTHER PUBLICATIONS

U.S. Appl. No. 11/913,423, filed Nov. 2, 2007 (§ 371 National Stage of WO 2006/119063 A2).
International Search Report and Written Opinion for PCT/US2006/016346, dated Sep. 21, 2004.
Fuerstenau, D. W.; Kapur, P. C.; and Mitra, A. K., "Dry Pelletization of Kaolin", Powder Technology, vol. 32, 1982, pp. 101-106.

* cited by examiner

*Primary Examiner* — Jerry A Lorengo
*Assistant Examiner* — Ross J Christie
(74) *Attorney, Agent, or Firm* — Finnegan, Henderson, Farabow, Garrett & Dunner, L.L.P.

(57) ABSTRACT

Disclosed herein is a method of calcining particulate material, such as kaolin. The method comprises providing a feed mixture comprising a particulate material, such as hydrous kaolin, wherein at least a portion of the particulate feed is coated with a liquid fuel. The method further comprises heating the particulate feed mixture to calcine the particulate feed and burn the liquid fuel to form a calcined product. The liquid fuel coating can act as a secondary, indirect heat source for calcining. The overall calcining temperatures and/or times can be reduced as a result of adding the liquid fuel.

31 Claims, No Drawings

METHODS OF CALCINING PARTICULATE MATERIAL

This application claims priority to U.S. Provisional Patent Application Nos. 60/566,939, filed May 3, 2004, and 60/635,944, filed Dec. 15, 2004.

The present invention relates to new methods for calcining particulate materials, such as kaolin. The resulting products can have many uses, such as fillers or extenders in paints, plastics, polymers, papermaking, and coating compositions. More generally, the products disclosed herein may be used wherever calcined kaolins are used.

Particulate kaolins occur naturally in the hydrous form and exist as crystalline structures containing at least one hydroxyl functionality. Particulate kaolins may be converted to a calcined form by thermal processes. Such processes cause the particulate kaolin to dehydroxylate. During calcination, the hydrous kaolin converts from a crystalline to an amorphous form. Further, during calcination, aggregation can occur. The size of the aggregates can be as small as a few microns and as large as a few millimeters in diameter, depending on the calcining temperatures involved and/or the calciner type used.

The calcination of particulate material, such as kaolin, requires high temperature conditions, often ranging from 500° C. to 1200° C., which can result in substantial energy expenditures. It is not surprising to find a calcining process that requires as high as 6 million Btu/ton (based on dry calcine feed rate) of thermal energy to produce fully calcined products from hydrous kaolin.

Accordingly, there remains a need for developing new and efficient calcining methods.

One aspect of the present disclosure provides a method for calcining particulate materials, comprising:

(a) providing a particulate feed mixture comprising a particulate material, wherein at least a portion of the particulate material is coated with a liquid fuel; and (b) heating the particulate feed mixture to calcine the particulate material and burn the liquid fuel to form a calcined product.

According to this aspect, coating at least a portion of the particulate material with liquid fuel can provide additional energy for heating the feed. The particulate material can be heated directly, e.g., via heat provided by a kiln, and indirectly via heat generated by burning the liquid fuel. As a result, the calcining can be performed at lower temperatures due to the synergistic effect arising from the use of liquid fuel that coats the particulate material. Accordingly, overall thermal energy requirements for the calcination can be reduced.

The use of a liquid fuel can also be beneficial as a secondary source of heat when compared to solid fuels. For example, liquid fuel can provide a higher heat value than solid fuels. At a given addition rate, fuel oil can yield more heat than any other solid fossil fuel source, such as charcoal, sawdust, organic sludge, etc. Moreover, the use of liquid fuels, such as hydrocarbons, does not result in the production of ash, which may cause discoloring of the calcined product.

Liquid fuels can be spread throughout the kaolin more homogeneously compared to solid fuels, via coating. As used herein, "particulate material is coated" refers to coating at least a portion of the accessible outer surface of the aggregate (if present in the particulate material), or at least a portion of the surface of the individual particle.

In one aspect, "liquid fuel" refers to a fuel that is a liquid at operating temperatures. For example, a fuel may be a solid at room temperature but may be sufficiently liquid at the time of mixing with the particulate material to coat the material.

In one aspect, "at least a portion of the particulate material" refers to at least about 50% of the particulate material being coated with liquid fuel. In another aspect, at least about 60% of the particulate material is coated with liquid fuel, such as at least about 75%, at least about 80%, at least about 90%, at least about 95% of the particulate material is coated. The adsorption density of liquid fuel on the particulate material (or the percentage of particle surface coated with liquid fuel) can be determined qualitatively and quantitatively by means of a variety of experimental methods such as BET, FTIR, XPS, differential thermal analysis, thermogravimetric analysis, analysis of VOC's and hydrocarbons, oil absorption testing, inverse gas chromatography, flash point testing, microcalorimetry, differential scanning calorimeter, etc.

The liquid fuel can be present in relatively small amounts to achieve the synergistic effect. In one aspect, the liquid fuel is present in the feed mixture in an amount ranging from about 0.01% to about 4% by weight, relative to the total weight of the feed mixture. In another aspect, the liquid fuel is present in the feed mixture in an amount ranging from about 0.01% to about 1% by weight, relative to the total weight of the feed mixture.

In one aspect, the particulate material, such as hydrous kaolin, can exist as individual particles and/or aggregates of the individual particles. Accordingly, in one aspect, the particulate material, such as hydrous kaolin, is chosen from aggregates and individual particles. "Chosen from" or "selected from" as used herein refers to selection of individual components or the combination of two (or more) components. For example, the particulate material can comprise aggregates only, individual particles only, or a mixture of aggregates and individual particles.

In one aspect, the particulate material in (a) is finely disseminated.

In one aspect, the particulate material in (a) has a mean diameter ranging from about 0.15 μm to about 500 μm.

In one aspect, the particulate material is chosen from hydrous kaolin having a mean diameter equal to or less than about 2 μm, i.e., the individual particles or aggregates have a mean diameter equal to or less than about 2 μm. In another aspect, the particulate hydrous kaolin has a mean diameter equal to or less than about 0.5 μm. In another aspect, the particulate hydrous kaolin has a mean diameter equal to or less than about 1 μm, such as a mean diameter equal to or less than about 0.15 μm.

As will be appreciated by those skilled in the art, the particle size distribution (psd) of a particulate material such as the pigment product disclosed herein may be determined by measuring the sedimentation rates of the dispersed particles of the particulate product through a standard dilute aqueous suspension by using a SEDIGRAPH™ instrument, e.g., SEDIGRAPH 5100, obtained from Micromeritics Corporation, USA. The size of a given particle is expressed in terms of the diameter of a sphere of equivalent diameter, which sediments through the suspension, i.e., an equivalent spherical diameter (esd), the parameter as referred to above. The SEDIGRAPH graphically records the percentage by weight of particles having an esd less than a particular esd value, versus that esd value.

In one aspect, the liquid fuel comprises a hydrocarbon oil. Exemplary hydrocarbon oils include fuel oils, vegetable oils, modified vegetable oils, waste oils, aliphatic and aromatic alcohols, and biodiesels.

Exemplary fuel oils include kerosene, petroleum, mineral oil, turpentine, gasoline, diesel, No. 2 fuel oil, No. 4 fuel oil, No. 5 light fuel oil, No. 5 heavy fuel oil, and No. 6 fuel oil. Representative vegetable oils include canola oil, soybean oil, corn oil, palm oil, olive oil, sunflower oil, cottonseed oil, peanut oil, sesame oil and safflower oil. The vegetable oils can comprise one or more fatty acids. The modified vegetable oils can be methyl-, ethyl-, propyl-, butyl, (or higher alkyl) esters of canola oil, soybean oil, corn oil, palm oil, olive oil, sunflower oil, cottonseed oil, peanut oil, sesame oil and safflower oil. Exemplary waste oils include industrial and domestic waste oils, such as waste fat and grease oil, used motor oil, and biodiesels of waste oils.

Another aspect provides a method for calcining kaolin, comprising:

(a) providing a feed mixture comprising particulate hydrous kaolin, wherein at least a portion of the particulate hydrous kaolin is coated with a liquid fuel; and (b) heating the feed mixture to at least partially dehydroxylate the hydrous kaolin and burn the liquid fuel.

Prior to the heating in (b), the kaolin can be subjected to one or more well known beneficiation steps to remove undesirable impurities. For example, an aqueous suspension of kaolin clay may be subjected to a froth flotation treatment operation to remove titanium containing impurities in the froth. The slurry can be conditioned with an oleic acid to coat the air bubbles produced in the float cells. The titania minerals adhere to the air bubbles and are floated out of the kaolin slurry. An example of such a flotation process is described in U.S. Pat. No. 3,450,257, to Cundy, which is herein incorporated by reference. This process can result in an improved brightness in the kaolin pigment, e.g., a GE brightness gain ranging from about 0.1 to about 3 units.

Pigment color can be assessed with Hunter L*a*b* coordinates, where components a, b, and L are the color component values on the color space scale as measured by a Hunter Ultrascan XE instrument. "+a" is a measure of red tint; "−a" is a measure of green tint; "+b" is a measure of yellow tint; "−b" is a measure of blue tint; "L" is a measure of whiteness. The process disclosed herein can result in improved Hunter "a" and "b" values. As used herein, the more negative "a" value and the lower "b" value is indicative of better product quality.

Alternatively, or in addition, the kaolin may be passed as a suspension through a high intensity magnetic separator to remove iron containing impurities, prior to (b). A standard high intensity wet magnetic separator can be used. This process can also result in a brightness gain ranging from about 0.1 to about 3.0 units.

Also optionally, the kaolin can be subjected to a selective flocculation process prior to (b) in which the impurities are flocced out of suspension while the kaolin clay remains in suspension. In one example, a high molecular weight anionic polymer having a molecular weight in excess of one million, or a molecular weight in the range of about 10 to about 15 million can be used. The anionic polymer can be a copolymer of a polyacrylamide or polyampholyte. The refined clay slurry may be ozoned, leached (bleached), and/or filtered. The clay may then be acid flocculated and dried, or may be redispersed in a makedown tank and alternately spray dried. Details of a selective flocculation process can be found in U.S. Pat. No. 4,227,920 to Chapman and Anderson, the disclosure of which is incorporated by reference herein. U.S. Pat. No. 5,685,900 to Yuan et al., includes a description of an ozonation process, the disclosure of which is incorporated by reference herein.

In one aspect, the feed mixture in (a) can be provided by coating the particulate material with the liquid fuel in a mixer. In one aspect, a high or low intensity mixer can be used for mixing/coating the calcine kaolin feed with fuel oil before the heating in (b). One example of a high intensity mixer is a Gunter Papenmeier GmbH & Co, Detmold, Germany, Model No: TGAHK 8, ID Number: 4564, which has an 8-liter capacity, stainless steel jacketed bowl with two stage mixing blades rotating from the bottom of the vessel. The rotational speed of mixing blades can be as high as 4,000 rpm. In one aspect, the rotational speed during coating ranges from about 2,000 to about 3,500 rpm, such as a rotational speed of about 3,000 rpm. In another aspect, the particulate material and the liquid fuel in the mixer are subjected to a tip speed of less than about 10,000 feet per minute. In one aspect, the mixer provides homogenous hydrocarbon oil distribution on the surface of individual calcine feed particles or aggregates. Other kinds of high intensity mixers (e.g., Turbulizer™ etc.) may also be used in a continuous or batch application.

In one aspect, the coating time ranges from about 5 seconds to about 10 minutes, such as a coating time ranging from about 3 to about 6 minutes, e.g., about 5 minutes.

The coated calcine feed may be metered to a calciner through a screw feeder for calcining. The calciners that may be used for this purpose include horizontal rotary kilns, tunnel kilns, vertical calciners, and flash calciners.

In one aspect, "heating . . . to at least partially dehydroxylate the hydrous kaolin," as used herein, refers to the process of obtaining calcined kaolin encompassing any degree of calcination. "Calcined kaolin" as used herein refers to a kaolin that has been converted from the corresponding (naturally occurring) hydrous kaolin to the dehydroxylated form by thermal methods. Calcination can change, among other properties, the kaolin structure from crystalline to amorphous. Calcination is effected by heat-treating coarse or fine hydrous kaolin in any known manner, e.g., at temperatures ranging from about 500° C. to about 1250° C., such as temperatures ranging from about 500° C. to about 1200° C.

Accordingly, "at least partially dehydroxylate the hydrous kaolin," "calcined" (or "calcination"), as used in herein, may encompass any degree or type of calcination, including partial (meta) and/or full and/or flash calcination.

Heating the hydrous kaolin in (b) refers to any of the calcination processes discussed above. Heating to at least one temperature can comprise heating the hydrous kaolin at one temperature only, at two or more different temperatures, or over a range of temperatures. The heating can occur for a time to partially or fully calcine the hydrous kaolin depending on the heating time and temperature. For example, in one aspect, the heating in (b) is carried out for a sufficient time to partially calcine the hydrous kaolin. In another aspect, the heating in (b) is carried out for a sufficient time to fully calcine the hydrous kaolin.

The degree to which hydrous kaolin undergoes changes in crystalline form can depend upon the amount of heat to which the hydrous kaolin is subjected. Initially, dehydroxylation of the hydrous kaolin can occur upon exposure to heat. At temperatures below a maximum of about 850-900° C., the product is often considered to be partially dehydroxylated, with the resultant amorphous structure commonly referred to as a metakaolin. Frequently, calcination at this temperature is referred to as "partial calcination," and the product may also be referred to as "partially calcined kaolin." Further heating to temperatures above about 900-950° C. can result in further structural changes, such as densification. Calcination at these higher temperatures is commonly referred to as "full calcination," and the product is commonly referred to as 'fully calcined kaolin'.

In one aspect, the heating in (b) comprises heating the hydrous kaolin to at least one temperature ranging from about 900° C. to about 1200° C. Heating "to at least one temperature" encompasses heating the kaolin at a constant temperature, or over a range of temperatures. In one aspect, the hydrous kaolin is heated to at least one temperature ranging from about 950° C. to about 1150° C., or at least one temperature ranging from about 1000° C. to about 1100° C.

Additional calcination may cause formation of mullite. Mullite concentrations can range from about 2% to about 3% by weight, relative to the total weight of the composition, and may be useful in some end-use applications, such as ceramic catalyst substrates, e.g., cordierite substrates. In other aspects, mullite may be present in the composition in an amount ranging from greater than about 2%, greater than about 5%, or greater than about 8%, by weight relative to the total weight of the composition, such that they may also be useful in some end-use applications.

Effective calcining procedures include, but are not limited to, soak calcining and flash calcining. In soak calcining, a hydrous kaolin is heat treated at temperatures ranging from 500° C. to 1200° C., such as temperatures ranging from 800° C. to 1200° C., from 850-900° C., or from 900-950° C., as described herein, for a period of time (e.g., from at least about 1 minute to about 5 or more hours) sufficient to dehydroxylate the kaolin. In flash calcining, a hydrous kaolin is heated rapidly for a period of less than 1 second, typically less than 0.5 second.

The furnace, kiln, or other heating apparatus used to effect calcining of the particulate feed mixture may be of any known kind. In one aspect, the heating in (b) is performed with at least one of a rotary kiln, a vertical kiln, a flash kiln and a tunnel kiln. Known devices suitable for carrying out soak calcining include high temperature ovens and rotary and vertical kilns. Known devices for effecting flash calcining include toroidal fluid flow heating devices, such as those described in WO 99/24360, the disclosure of which is incorporated by reference herein.

In one aspect, the calcined kaolin product from (b) has a GE brightness comparable to or even greater than the GE brightness of a kaolin product calcined from an uncoated hydrous kaolin. In one aspect, similar GE brightness calcined kaolins according to the present invention can be achieved at lower calcining temperatures. In one aspect, the calcining temperature required for a liquid fuel coated hydrous kaolin is at least about 50° F. less than the calcining temperature for an uncoated hydrous kaolin, such as a calcining temperature of about 100-150° F. less than the calcining temperature for an uncoated hydrous kaolin. These lower temperatures assume comparable samples of hydrous kaolin and the same extent of calcining (e.g., full calcination, partial calcination, etc.).

In one aspect, the particulate material comprises a material chosen from minerals, rocks, cement raw materials, and ceramics raw materials. In another aspect, the particulate material comprises a mineral chosen from, but not limited to, kaolin, alumina, limestone, bauxite, gypsum, magnesium carbonate, calcium carbonate, dolomite, diatomite, and spodumene.

In one aspect, the calcined product from (b) is chosen from calcined kaolin, calcined alumina, calcined lime, calcined gypsum, calcined bauxite, calcined/fused magnesium carbonate, calcined calcium carbonate, calcined dolomite, calcined dolomite, calcined spodumene, cement, and ceramics products.

In one aspect, the particulate material is kaolin. Accordingly, this aspect provides a method for calcining kaolin, comprising:

(a) providing a feed mixture comprising particulate hydrous kaolin, wherein at least a portion of the particulate hydrous kaolin is coated with a liquid fuel; and (b) heating the feed mixture to at least partially dehydroxylate the hydrous kaolin and burn the liquid fuel.

Another aspect provides a calciner feed mixture, comprising:

a particulate feed chosen from aggregates and discrete particles, wherein at least a portion of the particulate feed is coated with a liquid fuel.

Another aspect provides a system for calcining a particulate feed, comprising:

(a) a mixer for receiving and mixing the particulate material with a liquid fuel to form a coated particulate feed mixture; and (b) a calciner for heating the coated feed mixture and for burning the liquid fuel.

The mixer and calciner can be discrete components, or can be connected, as understood by one of ordinary skill in the art, to form a continuous system.

In one aspect the mixer is a high intensity speed mixer containing blades capable of various rotational speeds. The calciner can be chosen from a rotary kiln, a vertical kiln, a flash kiln, and a tunnel kiln.

In one aspect, the system further comprises a screw feeder for metering the feed particulate material to the calciner.

In one aspect, the product exiting the calciner in (b) has a steeper particle size distribution than the particulate material in (a). Particle size distribution (psd) of particulate material is often characterized by a "steepness." Steepness is derived from the slope of a psd curve, where the particle diameter is plotted on the x-axis against a cumulative weight percentage of particles on the y-axis. A wide particle distribution has a low steepness value, whereas a narrow particle size distribution gives rise to a high steepness factor. In one aspect, the steepness is measured by a ratio of $d_{30}/d_{70}$, as determined by Sedigraph 5100. The values $d_{30}$ and $d_{70}$ are the particle esd at which there are 30% and 70% by weight of the particles, respectively, which have an esd less than the $d_{30}$ and $d_{70}$ values.

In one aspect, the product exiting the calciner has a steepness value of at least about 58, such as a steepness value of at least about 60, as determined by the ratio $d_{30}/d_{70} \times 100$.

The calcined kaolin compositions disclosed herein can be used for a variety of applications where increased opacity, whiteness or sheen/gloss control are desired. For example, the calcined kaolin products disclosed herein can be used in coating compositions in which any one of these characteristics are desired. Products disclosed herein may also be useful wherever kaolins are used, such as in making filled plastics, rubbers, sealants, and cables, or they may be used in the manufacture of ceramic products, cementitious products, and paper products and paper coatings.

Calcined kaolins can be used to improve the opacity of a pigment and find widespread use as pigments in paints, plastics, rubbers, sealants, and as raw materials for ceramics, cementitious products and other application compositions. For example, calcined kaolins can be used as flatting (or matting) agents in paints and coatings. They can help control the gloss and sheen of the surfaces of a final, dried paint film. Regarding optical paint film properties, they can impart opacity, whiteness, and other desirable properties. They can also serve as extenders by partial replacement of titanium dioxide and other more expensive pigments with minimal loss of whiteness or opacity.

The products and compositions disclosed herein can be used in the production of all paper grades, from ultra lightweight coated paper to coated or filled board. Paper and paperboard products can comprise a coating, which can improve the brightness and opacity of the finished paper or board.

The disclosed products can also serve as extenders, allowing the partial replacement of expensive titanium dioxide pigments without unacceptable loss of opacity or tint strength. The extender material can be used in paper, polymers, paints and the like or as a coating pigment or color ingredient for coating of paper, paper board, plastic, papers and the like.

Paint compositions comprising calcined kaolin and optionally at least one ingredient chosen from thickeners, dispersants, and biocides, as described herein, may additionally comprise at least one additional ingredient chosen from a polymeric binder, a primary pigment such as titanium dioxide, a secondary pigment such as calcium carbonate, silica, nepheline syenite, feldspar, dolomite, diatomaceous earth, and flux-calcined diatomaceous earth. For water-based versions of such paint compositions, any water-dispersible binder, such as polyvinyl alcohol (PVA) and acrylics may be used. Paint compositions disclosed herein may also comprise other conventional additives, including, but not limited to, surfactants, thickeners, defoamers, wetting agents, dispersants, solvents, and coalescents.

Paper coatings disclosed herein can include, in addition to the calcined kaolin as described above, materials generally used in the production of paper coatings and paper fillers. The compositions can include a binder and a pigment, such as $TiO_2$. The coatings may optionally include other additives, including, but not limited to, dispersants, cross linkers, water retention aids, viscosity modifiers or thickeners, lubricity or calendering aids, antifoamers/defoamers, gloss-ink hold-out additives, dry or wet rub improvement or abrasion resistance additives, dry or wet pick improvement additives, optical brightening agents or fluorescent whitening agents, dyes, biocides, leveling or evening aids, grease or oil resistance additives, water resistance additives and/or insolubilizers.

Any art recognized binder may be used in the compositions and products disclosed herein. Exemplary binders include, but are not limited to, adhesives derived from natural starch obtained from a known plant source, for example, wheat, corn, potato or tapioca; and synthetic binders, including styrene butadiene, acrylic latex, vinyl acetate latex, or styrene acrylic, casein, polyvinyl alcohol, polyvinyl acetate, or mixtures thereof.

Paper coatings have very different binder levels depending upon the type of printing to be used with the coated paper product. Appropriate binder levels based upon the desired end product would be readily apparent to the skilled artisan. Binder levels are controlled to allow the surfaces to receive ink without disruption. The latex binder levels for paper coatings generally range from about 3% to about 30%. In one aspect, the binder is present in the paper coating in an amount of from about 3% to about 10%. In another aspect, the binder is present in the coating in an amount ranging from about 10% to about 30% by weight.

In another aspect, the present disclosure provides a polymer comprising the calcined composition as described herein.

In one aspect, the present disclosure provides a feed for a ceramic, wherein the feed comprises the calcined feed as described herein. The ceramic can be used for supporting a catalyst, e.g., such as a catalyst used in a catalytic converter. In another aspect, the ceramic comprises the catalyst.

Even further disclosed herein are products comprising the disclosed compositions such as: coatings, e.g. non-aqueous coatings for paper; inks; paints; polymer products; rubber products; and barrier coating compositions.

In one aspect, the present disclosure provides a coating, such as a non-aqueous coating for paper or paperboard, comprising the calcined products, such as calcined kaolin, disclosed herein. The coating can further comprise at least one binder chosen from binders conventionally used in the art. Exemplary binders include, but are not limited to, adhesives derived from natural starch and synthetic binders, including, for example, styrene butadiene, acrylic latex, vinyl acetate latex, or styrene acrylic, casein, polyvinyl alcohol, polyvinyl acetate, or mixtures thereof.

Paper and paper board coatings may have different binder levels depending on the end use of the coated product. Appropriate binder levels based upon the desired end product would be readily apparent to the skilled artisan. For example, binder levels can be controlled to allow the surfaces to receive ink without disruption. The latex binder levels for paper or paper board coatings generally range from 3% to 30% by weight relative to the total weight of the coating. For example, the at least one binder can be present in an amount ranging from 3% to 30%, such as from 10% to 30%, by weight relative to the total weight of the coating. Paper or paper board coatings can include the kaolins disclosed herein in an amount ranging from about 3% to about 95% by weight on a dry coating basis.

Another aspect provides a coated paper comprising a fibrous substrate and a coating on the substrate comprising a paper coating composition as described above.

In another aspect, the present disclosure provides an ink comprising, in an appropriate medium, the kaolins disclosed herein. The "ink" disclosed herein can be chosen from aqueous inks and non-aqueous inks, including, for example, gravure inks, heat-set inks, lithographic printing inks, and newsprint inks. The products disclosed herein can serve, for example, as a pigment in the ink and can provide economic advantage to the ink product, as they can exhibit high dispersion rate in both aqueous medium and non-aqueous medium.

The appropriate medium in the ink disclosed herein can be chosen from aqueous media and non-aqueous media conventionally used in the art.

Depending on the final applications of the ink, the ink disclosed herein can further comprise at least one component chosen, for example, from resins, such as vinyl resins; polymers; additives, such as rheology modifiers, surfactants, and drying accelerating agents such as sodium lauryl sulfate, N,N-diethyl-m-toluamide, cyclohexylpyrrolidinone and butyl carbitol; fillers; diluents; humectants, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones; and biocides, such as benzoates, sorbates, and isothiazolones. The ink product can further comprise at least one additional pigment chosen from those conventionally used in the art.

The amount of calcined product disclosed herein in a given ink can vary greatly based on the formulation of the ink, as would be apparent to one of ordinary skill in the art. For example, in some aspects the kaolin can comprise from 5%-45% by weight of the ink as formulated.

In another aspect, the present disclosure provides a paint, such as an aqueous or non-aqueous industrial coating, architectural paint, deco paint, or art paint, comprising, in an appropriate medium, the calcined products disclosed herein. The calcined products disclosed herein can serve, for example, as a gloss control agent pigment in the paint. The calcined products can generally be present in an amount less than the critical pigment volume. However, the pigments can also be present in higher pigment volume concentrations, such as for example in the range of 1% to 80% by weight on a dry film basis.

The paint disclosed herein can further comprise at least one component chosen from binders, such as polymeric binders, for example, water dispersible binders chosen, for example, from polyvinyl alcohol (PVA) and latex; and additives conventionally used in paints, chosen, for example, from surfactants, thickeners, biocides, defoamers, wetting agents, dispersants, and coalescents. The paint disclosed herein can comprise at least one additional pigment chosen, for example, from $TiO_2$ and calcium carbonate.

In another aspect, the present disclosure provides a polymer product comprising the calcined products disclosed herein. The calcined products can be present at a concentration of up to 60% by weight of the polymer as compounded and up to 30% by weight of the final polymer article. The calcined products can be used for at least one application chosen from resin extension (i.e., filling), $TiO_2$ extension, and reinforcement of the polymer.

The polymer product disclosed herein comprises at least one polymer resin. The term "resin" means a polymeric material, either solid or liquid, prior to shaping into a plastic article. The at least one polymer resin can be one which, on cooling (in the case of thermoplastic plastics) or curing (in the case of thermosetting plastics), can form a plastic material.

The at least one polymer resin, which can be used herein, can be chosen, for example, from polyolefin resins, polyamide resins, polyester resins, engineering polymers, allyl resins, thermoplastic resins, and thermoset resins.

In another aspect, the present disclosure provides a rubber product comprising the calcined products disclosed herein. The products can provide the benefits of resin extension, reinforcement of the rubber, and increased hardness of the rubber composition. The rubber product disclosed herein comprises at least one rubber chosen from natural rubbers and synthetic rubbers. For example, sulphur-vulcanisable rubbers, which can be used for manufacture of tire treads can be used in the products and methods disclosed herein. Examples of synthetic rubbers include, but are not limited to, styrene-butadiene rubber (SBR), vinyl-styrene-butadiene rubber (VSBR), butadiene rubber (BR), and neoprene rubber or polyisoprene. The SBR may be emulsion SBR (E-SBR) or solution SBR (S-SBR). The VSBR may be solution VSBR (S-VSBR). And examples of the BR include, but are not limited to, cis-1,3-polybutadiene rubber and cis-1,4-polybutadiene rubber. An example of the natural rubbers, which can be used, is Standard Malaysian natural rubber.

The rubber product disclosed herein may further comprise at least one additive chosen from conventional additives used in the art, for example, extender oils and mineral and synthetic fillers. The rubber can include the kaolin in an amount up to 35% by weight as formulated.

Another aspect of the present disclosure provides a method of making a barrier coating from a fine kaolin having the properties described herein. Barrier coatings are useful to impart to paper resistance to moisture, moisture vapor, grease, oil, air, etc. When making barrier coatings, the amount of binder in the formulation may be very high on the order of 40% to 50%.

Another aspect of the present disclosure provides a barrier coating composition, comprising a slurry comprising the calcined kaolin described herein. The solids content of the slurry can range from about 45% to about 70%.

Another aspect of the present disclosure provides a method of improving barrier properties in a paper comprising coating a fibrous substrate with a paper coating composition comprising calcined products as described herein.

The invention will be further clarified by the following non-limiting examples, which are intended to be purely exemplary of the invention.

EXAMPLE 1

This Example provides comparative data for kaolin calcined according to the present invention ("inventive") versus kaolin calcined by a prior art method ("standard").

For the standard kaolin sample, a hydrous kaolin sample with 83.1 GE brightness was calcined at constant feed rate and various kiln temperatures in a continuous pilot-scale Harper rotary kiln (4" diameter×51" long), with a kiln rotational speed of 2.5 rpm. The kiln (calcine) temperatures, feed rate (rate of feed mixture entering kiln), product rate (rate of calcined kaolin exiting kiln), and resulting GE Brightness are shown in Table I below.

TABLE I

| Kiln Temperature (° F.) | Feed rate* (g/min) | Product rate (g/min) | Product Brightness (GE) |
|---|---|---|---|
| 1,950 | 30.0 | 22.7 | 91.43 |
| 1,950 | 30.0 | 23.3 | 91.53 |
| 1,950 | 30.0 | 23.8 | 91.58 |
| 1,975 | 30.0 | 23.7 | 91.73 |
| 1,975 | 30.0 | 23.8 | 91.87 |
| 1,975 | 30.0 | 24.4 | 91.80 |
| 2,000 | 30.0 | 24.0 | 92.08 |
| 2,000 | 30.0 | 24.8 | 92.06 |
| 2,025 | 30.0 | 25.0 | 92.35 |
| 2,025 | 30.0 | 25.4 | 92.26 |

For the inventive sample, the same hydrous kaolin was coated with No. 2 diesel fuel oil in an amount of 20 lbs/ton hydrous kaolin with a batch-scale Papenmeier high intensity mixer. The inventive feed mixture was calcined at the kiln temperatures shown in Table II below, which also provides the feed rate (rate of feed mixture entering kiln), product rate (rate of product produced by the kiln), and resulting GE Brightness.

TABLE II

| Kiln Temperature (° F.) | Feed rate (g/min) | Product rate (g/min) | Product Brightness (GE) |
|---|---|---|---|
| 1,900 | 33.3 | 25.1 | 91.58 |
| 1,900 | 33.3 | 25.6 | 91.62 |
| 1,925 | 33.3 | 24.2 | 91.72 |
| 1,925 | 33.3 | 23.3 | 91.70 |
| 1,950 | 33.3 | 25.2 | 91.89 |
| 1,950 | 33.3 | 27.0 | 92.02 |
| 1,975 | 33.3 | 28.0 | 92.34 |

TABLE II-continued

| Kiln Temperature (° F.) | Feed rate (g/min) | Product rate (g/min) | Product Brightness (GE) |
|---|---|---|---|
| 1,975 | 33.3 | 28.6 | 92.29 |
| 2,000 | 33.3 | 27.6 | 92.44 |
| 2,000 | 33.3 | 28.0 | 92.38 |
| 2,025 | 33.3 | 26.3 | 92.37 |

From comparing the data of Tables I and II, it can be seen that the calcined kaolin prepared by a method according to the present invention resulted in calcined kaolin having comparable or higher GE Brightness values achieved at lower calcining temperatures. As shown, comparable calcine product brightness could be achieved at a kiln temperature of 1,975° F. when the calcine feed was coated with 20 lbs/ton of No. 2 fuel oil, instead of 2,025° F. kiln temperatures when no fuel oil was used. In addition, the calcine feed rates and product rates were increased as a result of increased bulk density of feed material with the use of fuel oil. Overall, the calcine temperatures required to reach a given brightness were reduced by about 50° F. with an approximately 10% increase in product rate (compare the product rate of 26.3 g/min versus 24.1 g/min). One can also see that at a given temperature, fuel oil coated sample yields 0.5-0.6 units higher brightness values in the calcine product.

EXAMPLE 2

A comparative test was performed in a manner similar to that described in Example 1, with standard hydrous kaolin calcined according to a prior art method versus hydrous kaolin calcined after being coated with 30 lbs/ton No. 2 fuel oil ("Inventive").

Table III shows the particle size distribution of the hydrous kaolin feed sample and calcine product samples with and without using fuel oil to pre-coat the calcine feed material.

TABLE III

| Sample | <10 μm | <5 μm | <2 μm | <1 μm | <0.5 μm | <0.25 μm | % residue (+325 mesh material) | Einlehner Abrasion Value |
|---|---|---|---|---|---|---|---|---|
| Standard calcined kaolin (at 2,075° F.) | 99.2 | 96.4 | 90.0 | 73.8 | 22.9 | 2.3 | 0.64 | 4.98 |
| Inventive calcined kaolin (at 2,000° F.) (coated with 30 lbs/ton fuel oil) | 98.4 | 96.0 | 89.6 | 73.0 | 18.5 | 2.4 | 0.42 | 4.90 |
| Hydrous kaolin (calcine feed) | 100.1 | 99.0 | 98.4 | 95.3 | 82.9 | 54.4 | — | — |

From the data of Table III, it can be seen that the particle size distributions were similar for the uncoated kaolin and kaolin coated with fuel oil. It was also observed that the % residue (+325 mesh) was reduced for the inventive calcined kaolin. The Einlehner abrasion value was slightly reduced for the inventive calcined kaolin.

The calcining temperatures, feed rate (rate of feed mixture entering kiln), product rate (rate of product produced by the kiln), and resulting GE Brightness are shown in Table IV and V below, for the standard and inventive kaolin samples, respectively.

TABLE IV

| Kiln Temperature (° F.) | Feed rate (g/min) | Product rate (g/min) | Product Brightness (GE) |
|---|---|---|---|
| 2,000 | 26.2 | 21.7 | 92.04 |
| 2,000 | 26.2 | 22.0 | 91.81 |
| 2,025 | 26.2 | 21.1 | 92.02 |
| 2,025 | 26.2 | 21.8 | 92.08 |
| 2,025 | 26.2 | 22.2 | 91.95 |
| 2,050 | 26.2 | 22.3 | 92.14 |
| 2,050 | 26.2 | 21.3 | 92.21 |
| 2,050 | 26.2 | 21.8 | 92.20 |
| 2,075 | 26.2 | 22.8 | 92.56 |
| 2,075 | 26.2 | 22.8 | 92.58 |
| 2,075 | 26.2 | 22.0 | 92.72 |

TABLE V

| Kiln temperature (° F.) | Feed rate (g/min) | Product rate (g/min) | Brightness (GE) |
|---|---|---|---|
| 1,950 | 26.6 | 20.7 | 92.23 |
| 1,950 | 26.6 | 21.7 | 91.77 |
| 1,950 | 26.6 | 20.6 | 91.67 |
| 1,975 | 26.6 | 19.6 | 92.18 |
| 1,975 | 26.6 | 19.0 | 92.15 |
| 1,975 | 26.6 | 18.8 | 92.17 |
| 2,000 | 26.6 | 20.5 | 92.46 |
| 2,000 | 30.0 | 25.3 | 92.75 |
| 2,000 | 30.0 | 25.2 | 92.57 |

From this data, it can be seen that the calcined kaolin prepared by a method according to the present invention resulted in calcined kaolin having comparable GE Brightness values achieved at lower temperatures. The calcining temperatures were reduced by approximately 75° F. (compare maximum value of 2,075° F. versus 2,000° F.) with a 10% increase in product throughput. These values corresponded to an approximately 15% thermal reduction (or fuel consumption) in the kiln.

EXAMPLE 3

Example 3 provides a comparative test performed with standard hydrous kaolin calcined according to a prior art method versus hydrous kaolin calcined after being coated with various doses of fuel oil (5, 7.5, 10, and 20 lbs/ton). 525 g hydrous kaolin (with 81.61 GE brightness) was coated with No. 2 fuel oil in a laboratory mixer/coater for 5 min before calcining in a laboratory muffle type furnace (Barnstead/Thermolyne, Model No: FA1748-1). The calcining temperatures and resulting GE brightness are shown in Table VI, below.

TABLE VI

| Kiln Temperature (° F.) | Product GE Brightness (standard kaolin) | | Product GE Brightness (inventive kaolin, i.e., pre-coated with fuel oil) | | | |
|---|---|---|---|---|---|---|
| | w/o pre-mixing in Papenmeier mixer | w/ pre-mixing in Papenmeier mixer | 5 lbs/ton | 7.5 lbs/ton | 10 lbs/ton | 20 lbs/ton |
| 1,678 | 85.80 | 86.21 | — | 86.82 | 86.84 | 88.16 |
| 1,786 | 87.94 | 88.45 | — | 89.25 | 89.42 | 90.46 |
| 1,858 | 89.00 | 89.50 | 90.10 | 90.14 | 90.41 | 90.81 |
| 1,958 | 90.14 | 90.34 | 90.90 | 90.95 | 91.06 | 91.40 |
| 2,038 | 90.75 | 91.03 | 91.35 | 91.54 | 91.57 | 91.69 |

From this data, it can be seen that the inventive calcined kaolin achieved a higher GE brightness values at all fuel oil addition levels when calcined at the same temperatures (see Table VI, fuel oil coated samples yield 0.7-2.4 units higher GE brightness values). Within the inventive calcined kaolin samples, the GE Brightness increased with increased addition of fuel oil.

EXAMPLE 4

This Example describes mixing/coating hydrous kaolin coated with fuel oil at various mixing speeds and the effect of mixing speed on Hunter brightness "a" and "b" coordinates.

Hydrous kaolin of Example 1 was calcined after being coated with 30 pounds/ton No-2 fuel oil (500 g calcine feed) with either a high speed mixer or low speed mixer (auger) (Ross® Planetary Mixer) for 5 minutes. After mixing, the samples were calcined in a laboratory muffle furnace at 1,050° C. (kiln temperature) for 30 min.

The effects of mixing speed on GE and Hunter brightness values of the calcined kaolins are shown in Table VII, below.

TABLE VII

| Mixer Settings | GE Brightness | L[1] | a[1] | b[1] |
|---|---|---|---|---|
| 0 | 92.32 | 97.62 | −0.02 | 2.52 |
| 1.0 | 92.77 | 97.77 | −0.18 | 2.41 |
| 2.0 | 92.95 | 97.82 | −0.17 | 2.34 |
| 3.0 | 92.97 | 97.81 | −0.15 | 2.31 |
| 4.0 | 92.83 | 97.78 | −0.18 | 2.36 |

[1]Hunter UltraScan XE

It can be seen that increasing the mixing speed improved the Hunter "a" and "b" values, where the more negative "a" values and lower "b" values are indicative of improved product qualities along with the higher brightness values. The data presented for "0" mixer settings corresponds to the calcine sample that is not pre-coated with No-2 fuel oil.

EXAMPLE 5

This Example describes mixing/coating hydrous kaolin coated with No-2 fuel oil at various mixing time periods and the effect of mixing time on GE and Hunter brightness "a" and "b" coordinates.

Hydrous kaolin of Example 1 was calcined after being coated with 30 pounds/ton No-2 fuel oil (500 g calcine feed) with a Ross® Planetary Mixer at 4 mixer settings. The GE and Hunter brightness values of the calcined kaolins are listed in Table VIII, below.

TABLE VIII

| Mixing Time (min) | Brightness | L | a | b |
|---|---|---|---|---|
| 0 | 92.34 | 97.58 | 0.10 | 2.43 |
| 0.5 | 92.90 | 97.78 | −0.08 | 2.31 |
| 1.0 | 92.96 | 97.78 | −0.04 | 2.28 |
| 2.5 | 92.89 | 97.77 | −0.07 | 2.32 |
| 5.0 | 92.97 | 97.80 | −0.07 | 2.30 |

[1]Hunter UltraScan XE

It can be seen that coating the kaolin with fuel oil can be achieved within a very short time (e.g., less than 0.5 min.) to achieve improved Hunter "a" and "b" values. For comparison, in this table, the values are given for the calcine sample that is not pre-coated with No-2 fuel oil (mixing time, 0 minutes). As compared to the control test (no mixing time), the samples that are pre-coated with the fuel oil prior to the calcining gave better brightness, "L", "a" and "b" values in the entire range of mixing time from 30 seconds to 5 minutes.

EXAMPLE 6

This Example demonstrates the effect of calcining kaolin coated with fuel oil on various properties, including brightness, abrasion and steepness values versus the properties of a kaolin that was calcined according to prior art methods ("control sample").

The hydrous kaolin used to prepare the control sample had a GE brightness of 83.1. The hydrous kaolin was calcined at constant feed rate and various kiln temperatures in a continuous pilot-scale Harper rotary kiln (4" diameter×51" long), with a kiln rotational speed of 2.5 rpm. Table IX sets forth the calcining temperatures, feed rate (rate of feed mixture entering kiln), product rate (rate of product produced by the kiln), and resulting abrasion values and GE Brightness of the control sample. The results presented in Table IX represents the control tests (standard calcining) in that no fuel oil has been used prior to the calcining.

TABLE IX

| TEMP. SET POINT (° F.) | FEED RATE (g/min) | PRODUCT RATE (g/min) | BRIGHTNESS (GE) | ABRASION (mg) |
|---|---|---|---|---|
| 2,050 | 26.2 | 22.3 | 92.14 | 5.13 |
| 2,050 | 26.2 | 21.3 | 92.21 | 4.53 |
| 2,050 | 26.2 | 21.8 | 92.20 | 5.98 |
| 2,075 | 26.2 | 22.8 | 92.56 | 5.30 |
| 2,075 | 26.2 | 22.8 | 92.58 | 6.53 |
| 2,075 | 26.2 | 22.0 | 92.72 | 4.98 |
| 2,025 | 26.2 | 21.1 | 92.02 | 5.88 |
| 2,025 | 26.2 | 21.8 | 92.08 | 5.28 |
| 2,025 | 26.2 | 22.2 | 91.95 | 5.28 |
| 2,000 | 26.2 | 21.7 | 92.04 | 4.58 |
| 2,000 | 26.2 | 22.0 | 91.81 | |

The inventive sample was coated in a batch type mixer/coater (Papermeier mixer) with 30 pounds/ton No-2 fuel oil and calcined in the pilot-scale Harper rotary kiln in the same way as the control sample. Table X sets forth the calcining temperatures, feed rate (rate of feed mixture entering kiln), product rate (rate of product produced by the kiln), and resulting abrasion values and GE Brightness values obtained using No-2 fuel oil for coating the calcine feed prior to calcining.

TABLE X

| TEMP. SET POINT (° F.) | FEED RATE (g/min) | PRODUCT RATE (g/min) | BRIGHTNESS (GE) | ABRASION (mg) |
|---|---|---|---|---|
| 1,950 | 26.6 | 20.7 | 92.23 | 5.30 |
| 1,950 | 26.6 | 21.7 | 91.77 | 5.13 |
| 1,950 | 26.6 | 20.6 | 91.67 | 5.05 |
| 1,975 | 26.6 | 19.6 | 92.18 | 4.30 |
| 1,975 | 26.6 | 19.0 | 92.15 | 4.28 |
| 1,975 | 26.6 | 18.8 | 92.17 | 5.18 |
| 2,000 | 26.6 | 20.5 | 92.46 | 5.48 |
| 2,000 | 30 | 25.3 | 92.75 | 4.90 |
| 2,000 | 30 | 25.2 | 92.57 | 4.88 |

The particle size distribution values as a percentage of particles (by weight) finer than 2 μm, finer than 0.25 μm, and the $d_{50}$ and steepness values ($d_{30}/d_{70} \times 100$) are listed for the control sample (Table XI) and inventive sample (Table XII).

TABLE XI

| Temp. (° F.) | <2 μm | <0.25 μm | Abrasion | $d_{50}$ | Steepness |
|---|---|---|---|---|---|
| 2,050 | 89.5 | 2.5 | 5.13 | 0.70 | 55 |
| 2,050 | 89.3 | 2.6 | 4.53 | 0.71 | 54 |
| 2,050 | 91.5 | 3.0 | 5.98 | 0.64 | 55 |
| 2,075 | 90.0 | 3.5 | 5.30 | 0.72 | 55 |
| 2,075 | 89.4 | 1.4 | 6.53 | 0.70 | 55 |
| 2,075 | 90.0 | 2.3 | 4.98 | 0.74 | 56 |
| 2,025 | 92.2 | 4.2 | 5.88 | 0.61 | 55 |
| 2,025 | 90.2 | 2.0 | 5.28 | 0.68 | 55 |
| 2,025 | 90.5 | 2.7 | 5.28 | 0.68 | 55 |
| 2,000 | 90.3 | 3.3 | 4.58 | 0.67 | 54 |
| 2,000 | 90.9 | 1.1 | | 0.67 | 55 |

TABLE XII

| Temp. (° F.) | <2 μm | <0.25 μm | Abrasion | $d_{50}$ | Steepness |
|---|---|---|---|---|---|
| 1,950 | 90.2 | 0.7 | 5.30 | 0.76 | 62 |
| 1,950 | 91.0 | 0.4 | 5.13 | 0.75 | 63 |
| 1,950 | 91.4 | — | 5.05 | 0.74 | 64 |
| 1,975 | 90.9 | 1.1 | 4.30 | 0.77 | 63 |
| 1,975 | 91.2 | 0.4 | 4.28 | 0.77 | 63 |
| 1,975 | 90.7 | 1.0 | 5.18 | 0.78 | 63 |
| 2,000 | 90.3 | 0.7 | 5.48 | 0.80 | 64 |
| 2,000 | 89.6 | 2.4 | 4.90 | 0.76 | 58 |
| 2,000 | 89.6 | 0.5 | 4.88 | 0.79 | 61 |

The data of Tables XI and XII indicate that the inventive kaolin has noticeably greater steepness values compared to the control sample.

EXAMPLE 7

This Example shows the improvement in calcined product recovery as a result of calcining hydrous kaolin that has been coated with a fuel oil. Kaolin calcined according to the present invention ("inventive") is compared with kaolin calcined by a prior art method ("control"). The inventive and standard kaolins were treated as described in Example 1 except that the fuel oil/kaolin ratio is 7.5 pounds/ton, and each sample was calcined at the indicated temperatures. The properties of the feed and product are shown in Table XIII below.

TABLE XIII

| | Control A | Control B | Control C | Control D | Inventive |
|---|---|---|---|---|---|
| Calcining temperature | 2,101° F. | 2,126° F. | 2,088° F. | 2,121° F. | 2,080° F. |
| Brightness (GE) | 92.40 | 92.45 | 92.70 | 92.70 | 92.65 |
| Abrasion | 5.50 | 7.20 | 5.00 | 7.00 | 6.05 |
| Residue (+325 mesh) | 0.0215 | 0.0215 | 0.0205 | 0.0399 | 0.0231 |
| Product PSD (<0.5 μm) | 84.3 | 85.1 | 85.9 | 85.6 | 84.8 |
| Feed Brightness (GE) | 82.2 | 82.2 | 82.2 | 82.4 | 82.2 |
| Feed PSD (<0.5 μm) | 86.1 | 85.6 | 85.7 | 87.6 | 85.8 |
| Feed rate to Kiln, TPH* | 3.6-3.8 | 3.8 | 3.8 | 3.6 | 3.8 |
| % Calcine Prod. Recovery | 80.50 | 80.90 | 80.36 | 80.93 | 81.94 |
| Therms/Feed Ton | 37.33 | 39.97 | 35.06 | 39.83 | 34.37 |
| Therms/Product Ton | 53.20 | 55.50 | 48.66 | 55.29 | 46.87 |

*tons per hour

It can be seen that although the inventive sample was calcined at a lower temperature than any of the four control samples A-D, it achieves a brightness greater than or comparable to the control samples at a higher product recovery. While not wishing to be bound by any theory, it is believed that the fuel oil acts as a binder, which allows the calcine feed mixture to form into loose agglomerates before entering the kiln. This agglomeration leads to a lower particle loss during processing. In addition, the lower kiln temperature further leads to improved product recovery as it requires less hot air to be blown in the kiln, which could entrain and carry particles out of the kiln. As expected from the lower calcining temperature, the energy expenditure from the calcining process is reduced for the inventive product, as indicated by the reduced "therms/feed ton" and "therms/product ton" values.

Other aspects of the invention will be apparent to those skilled in the art from consideration of the specification and practice of the invention disclosed herein. It is intended that the specification and examples be considered as exemplary only, with a true scope and spirit of the invention being indicated by the following claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

What is claimed is:

1. A method for calcining, comprising:
   (a) providing a feed mixture comprising a particulate material comprising hydrous kaolin coated with a liquid fuel, wherein the liquid fuel is present in the feed mixture in an amount ranging from about 0.01% to about 4% by weight, relative to the total weight of the feed mixture; and
   (b) heating the feed mixture to at least partially dehydroxylate the hydrous kaolin and burn the liquid fuel to form a calcined product having a first GE brightness equal to or greater than a second GE brightness for a second calcined product produced by calcining at a higher temperature a second hydrous kaolin devoid of the liquid fuel.

2. The method according to claim 1, wherein the liquid fuel comprises a hydrocarbon oil.

3. The method according to claim 2, wherein the hydrocarbon oil is chosen from fuel oils, vegetable oils, modified vegetable oils, waste oils, alcohols, and biodiesels.

4. The method according to claim 3, wherein the fuel oils are chosen from petroleum, mineral oil, turpentine, kerosene, gasoline, diesel, No. 2 fuel oil, No. 4 fuel oil, No. 5 light fuel oil, No. 5 heavy fuel oil, and No. 6 fuel oil.

5. The method according to claim 3, wherein the vegetable oils are chosen from canola oil, soybean oil, corn oil, palm oil, olive oil, sunflower oil, cottonseed oil, peanut oil, sesame oil and safflower oil.

6. The method according to claim 3, wherein the modified vegetable oils are chosen from methyl-, ethyl-, propyl-, and butyl esters of canola oil, soybean oil, corn oil, palm oil, olive oil, sunflower oil, cottonseed oil, peanut oil, sesame oil and safflower oil.

7. The method according to claim 3, wherein the waste oils are chosen from waste fat, grease oil, motor oil, and biodiesel of waste oils.

8. The method according to claim 1, wherein at least about 80% of the particulate material is coated with the liquid fuel.

9. The method according to claim 1, wherein at least about 90% of the particulate material is coated with the liquid fuel.

10. The method according to claim 1, wherein the liquid fuel is present in the feed mixture in an amount ranging from about 0.01% to about 1% by weight, relative to the total weight of the feed mixture.

11. The method according to claim 1, wherein the particulate material comprises particulate hydrous kaolin having a mean diameter less than about 2 µm.

12. The method according to claim 1, wherein the providing in (a) comprises coating the particulate material with the liquid fuel in a mixer.

13. The method according to claim 12, wherein the particulate material and the liquid fuel in the mixer are subjected to a rotational speed of up to about 4,000 rpm.

14. The method according to claim 13, wherein the rotational speed ranges from about 2,000 to about 3,500 rpm.

15. The method according to claim 12, wherein the particulate material and the liquid fuel in the mixer are subjected to a tip speed of less than about 10,000 feet per minute.

16. The method according to claim 1, wherein the heating in (b) comprises heating the feed mixture to at least one temperature ranging from about 500° C. to about 1250° C. for a time sufficient to at least partially dehydroxylate the hydrous kaolin.

17. The method according to claim 16, wherein the heating in (b) comprises heating the feed mixture to at least one temperature ranging from about 900° C. to about 1200° C. for a time sufficient to at least partially dehydroxylate the hydrous kaolin.

18. The method according to claim 17, wherein the heating in (b) comprises heating the feed mixture to at least one temperature ranging from about 950° C. to about 1150° C. for a time sufficient to at least partially dehydroxylate the hydrous kaolin.

19. The method according to claim 18, wherein the heating in (b) comprises heating the feed mixture to at least one temperature ranging from about 1000° C. to about 1100° C. for a time sufficient to at least partially dehydroxylate the hydrous kaolin.

20. The method according to claim 1, wherein the product of the heating in (b) comprises partially calcined kaolin.

21. The method according to claim 1, wherein the product of the heating in (b) comprises fully calcined kaolin.

22. The method according to claim 1, wherein the product of the heating in (b) comprises flash calcined kaolin.

23. The method according to claim 1, wherein the product of the heating in (b) comprises mullite.

24. The method according to claim 1, wherein the heating in (b) is performed by using at least one of a rotary kiln, a vertical kiln, a flash calciner and a tunnel kiln.

25. The method according to claim 1, wherein the particulate material in (a) is finely disseminated.

26. The method according to claim 1, wherein the particulate material in (a) has a mean diameter ranging from about 0.15 µm to about 500 µm.

27. The method according to claim 1, wherein the calcined product in (b) has a mean diameter ($d_{50}$) ranging from about 0.15 µm to about 2.0 µm.

28. The method according to claim 1, wherein the calcined product in (b) has a mean diameter ($d_{50}$) ranging from about 0.15 µm to about 1.0 µm.

29. The method according to claim 1, wherein the calcined product in (b) has a steepness value of at least about 58, as determined by the ratio $d_{30}/d_{70} \times 100$.

30. The method according to claim 1, wherein the calcined product in (b) has a steepness value of at least about 60, as determined by the ratio $d_{30}/d_{70} \times 100$.

31. The method according to claim 1, wherein a particle size distribution of the calcined product is steeper than a particle size distribution of the kaolin.

* * * * *